United States Patent
Duan et al.

(10) Patent No.: US 10,525,791 B2
(45) Date of Patent: Jan. 7, 2020

(54) INTELLIGENT IN-VEHICLE AIR-QUALITY CONTROL

(71) Applicant: International Business Machines Corporation, Armonk, NY (US)

(72) Inventors: Ning Duan, Shanghai (CN); Jing Chang Huang, Shanghai (CN); Peng Ji, Shanghai (CN); Chun Yang Ma, Beijing (CN); Zhi Hu Wang, Beijing (CN); Renjie Yao, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 339 days.

(21) Appl. No.: 15/471,332

(22) Filed: Mar. 28, 2017

(65) Prior Publication Data
US 2018/0281554 A1    Oct. 4, 2018

(51) Int. Cl.
| B60H 1/00 | (2006.01) |
| B60W 40/02 | (2006.01) |
| B60H 3/00 | (2006.01) |

(52) U.S. Cl.
CPC ......... B60H 1/008 (2013.01); B60H 1/00771 (2013.01); B60H 3/00 (2013.01); B60W 40/02 (2013.01)

(58) Field of Classification Search
CPC ...... B60H 1/008; B60H 1/00771; B60H 3/00; B60W 40/02
USPC .......................................................... 701/36
See application file for complete search history.

(56) References Cited

U.S. PATENT DOCUMENTS

| 6,316,073 B1* | 11/2001 | Hiscock ............. G09F 3/10 40/710 |
| 6,494,777 B1* | 12/2002 | Chiang ............. B60H 1/008 454/75 |
| 2009/0150310 A1* | 6/2009 | Okada ............. B60C 23/0408 706/12 |
| 2009/0326760 A1* | 12/2009 | Clark ............. B60H 1/00771 701/36 |

(Continued)

FOREIGN PATENT DOCUMENTS

| CN | 202693446 U | 1/2013 |
| CN | 103448511 A | 12/2013 |

(Continued)

OTHER PUBLICATIONS

Mel, et al. "The NIST Definition of Cloud Computing". Recommendations of the National Institute of Standards and Technology. Nov. 16, 2015, pp. M7-M13.

(Continued)

*Primary Examiner* — Marthe Y Marc-Coleman
(74) *Attorney, Agent, or Firm* — Joseph Petrokaitis, Esq.; McGinn IP Law Group, PLLC

(57) ABSTRACT

A mechanism is provided for controlling the internal air-quality of a vehicle. In-vehicle sensor data of a vehicle are acquired and the usage status of the vehicle is determined based on the acquired in-vehicle sensor data. Based on the acquired in-vehicle sensor data and the determined usage status, a changing trend of the in-vehicle air-quality is determined and responsive to the determined changing trend of the in-vehicle air-quality, a control system of the vehicle is signaled to control the usage status of the vehicle based on a control policy.

25 Claims, 8 Drawing Sheets

(56) References Cited

U.S. PATENT DOCUMENTS

| | | | | |
|---|---|---|---|---|
| 2012/0296567 | A1* | 11/2012 | Breed | G01C 21/26 |
| | | | | 701/468 |
| 2014/0262132 | A1* | 9/2014 | Connell | B60H 1/00457 |
| | | | | 165/11.1 |
| 2015/0032266 | A1* | 1/2015 | Weast | B60H 1/008 |
| | | | | 700/276 |
| 2015/0360544 | A1* | 12/2015 | Fruehsorger | B60H 3/06 |
| | | | | 96/19 |
| 2016/0176261 | A1* | 6/2016 | Khorana | B60H 1/008 |
| | | | | 165/248 |
| 2016/0239759 | A1* | 8/2016 | Sung | H01M 10/48 |
| 2016/0314818 | A1* | 10/2016 | Kirk | G11B 27/031 |
| 2016/0362118 | A1* | 12/2016 | Mollicone | B60W 40/09 |
| 2016/0370338 | A1* | 12/2016 | Sayfan | G01N 33/0062 |
| 2017/0136848 | A1* | 5/2017 | Trutnovsky | B60H 1/00864 |
| 2017/0174230 | A1* | 6/2017 | Goldman-Shenhar | |
| | | | | B60K 35/00 |
| 2017/0285762 | A1* | 10/2017 | Menath | G06F 3/017 |
| 2018/0057013 | A1* | 3/2018 | Mullett | B60W 50/0098 |
| 2018/0066944 | A1* | 3/2018 | Shu | G01C 21/206 |
| 2018/0072136 | A1* | 3/2018 | Kwon | B03C 3/04 |

FOREIGN PATENT DOCUMENTS

| | | | |
|---|---|---|---|
| CN | 103950364 | A | 7/2014 |
| CN | 104748322 | A | 7/2015 |
| CN | 104760490 | | 7/2015 |
| CN | 106314078 | A | 1/2017 |
| CN | 106467000 | A | 3/2017 |
| EP | 1 333 233 | A1 | 8/2003 |
| KR | 20070103228 | A * | 10/2007 |
| WO | WO 2015/012826 | A1 | 1/2015 |

OTHER PUBLICATIONS

Parveen Sevusu "Real-Time Air Quality Measurements Using Mobile Platforms", New Brunswick Rutgers, the State University of New Jersey. Jan. 2015, pp. 1-77.

International Search Report dated Apr. 20, 2018 in corresponding International Application No. PCT/CN2018/073754.

* cited by examiner

INTELLIGENT IN-VEHICLE AIR-QUALITY CONTROL

BACKGROUND

The present application relates generally to an improved data processing apparatus and method and more specifically to mechanisms for intelligent in-vehicle air-quality control.

Air pollution is an introduction of particulates, biological molecules, or other harmful materials into Earth's atmosphere, causing disease, death to humans, damage to other living organisms such as food crops, or the natural or built environment. Air pollution may come from anthropogenic, i.e. an effect or object resulting from human activity, or natural sources. Some of the main anthropogenic sources include: traffic, coal-burning, industry production, and dust emission. Current research shows that, among all the different types of commuting, travelling by car exposed individuals to the worst air-quality and thus, individuals suffer from various types of pollutants such as particular matter, black carbon, and the like.

SUMMARY

In an exemplary embodiment, the present invention can provide a computer-implemented method, in a data processing system comprising a processor and a memory coupled to the processor, for controlling the internal air-quality of a vehicle, the method including acquiring, by the data processing system, in-vehicle sensor data of a vehicle, determining, by the data processing system, the usage status of the vehicle based on the acquired in-vehicle sensor data, determining, by the data processing system, a changing trend of the in-vehicle air-quality based on the acquired in-vehicle sensor data and the determined usage status, and responsive to the determined changing trend of the in-vehicle air-quality, signaling, by the data processing system, a control system of the vehicle to control the usage status of the vehicle based on a control policy. One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
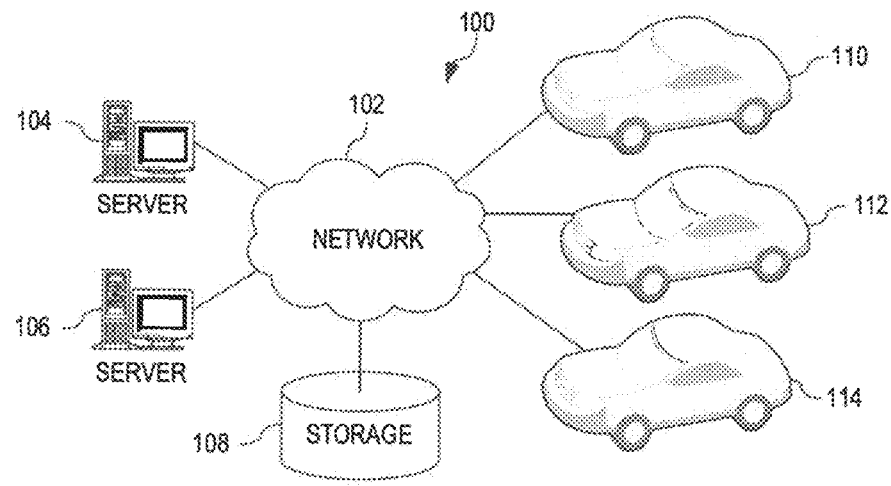
FIG. 1 is an example diagram of a distributed data processing system in which aspects of the illustrative embodiments may be implemented.

The invention will now be described with reference to FIGS. 1-8, in which like reference numerals refer to like parts throughout. It is emphasized that, according to common practice, the various features of the drawings are not necessarily to scale. On the contrary, the dimensions of the various features can be arbitrarily expanded or reduced for clarity.

Figure 3:
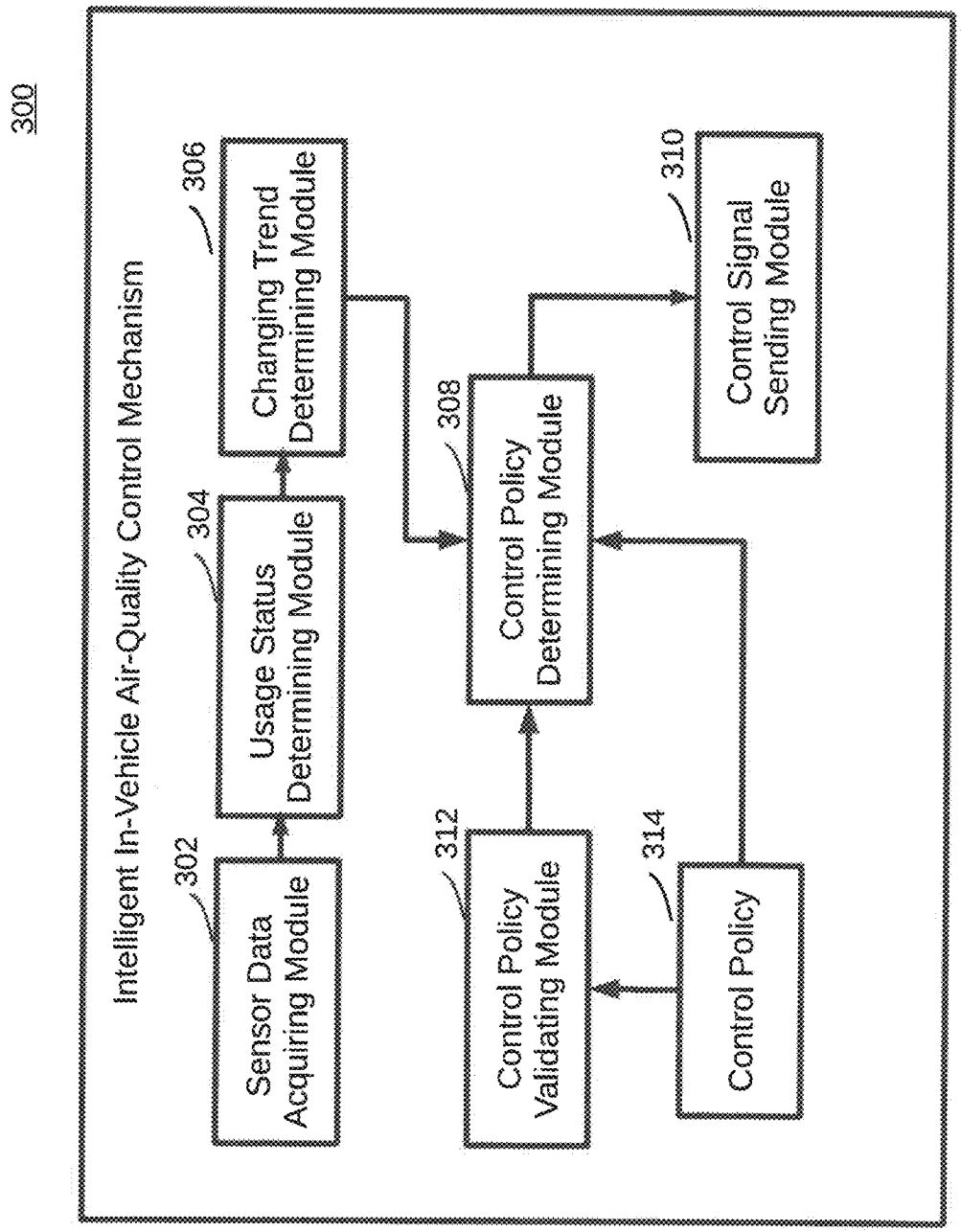
FIG. 3 depicts an exemplary block diagram of an intelligent in-vehicle air-quality control mechanism in accordance with an illustrative embodiment.
Figure 7:
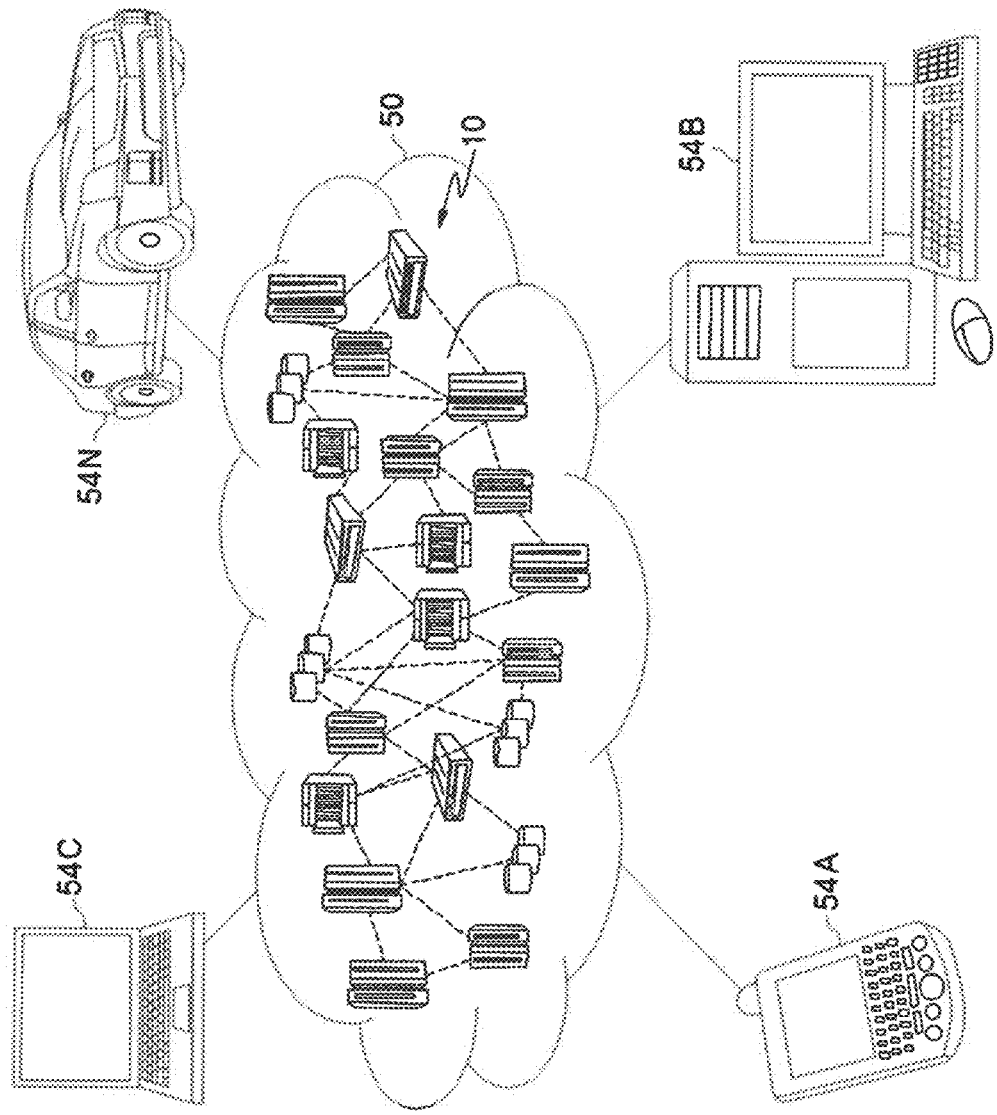
FIG. 7 exemplarily depicts a cloud computing environment in accordance with some embodiments of the present invention.

By way of introduction of the example depicted in FIG. 7, one or more computers of a computer system 12 according to an embodiment of the present invention can include a memory 28 having instructions stored in a storage system to perform the steps of FIG. 3.

The illustrative embodiments provide mechanisms for intelligent in-vehicle air-quality control. As noted above, current research shows that, among all the different types of commuting, travelling by car exposed individuals to the worst air-quality and thus, individuals suffer from various types of pollutants such as particular matter, black carbon, and the like. However, current automatic air control systems in a vehicle are only temperature aware and not air-quality aware, drivers are required to manually control the air circulation mode of the ventilation control between recirculating-air and fresh-air to maintain the air-quality in a vehicle. However, not only the ventilation mode but several other factors will also have impact on the in-vehicle air-quality. Therefore, manual control of the circulation mode of the air control system may be quite inaccurate and may even bring in more air pollutants. Thus, a driver may be exposed to air pollutants quite a long time before the driver realizes the air-quality is bad.

The illustrative embodiments of the invention provide an intelligent in-vehicle air-quality control mechanism which utilizes in-vehicle sensor data to determine the usage status of the vehicle. Further, a changing trend of the in-vehicle air-quality is determined based on the in-vehicle sensor data and the determined usage status. Responsive to the determined changing trend of the in-vehicle air-quality, the usage status of the vehicle is further controlled based on a control policy to improve the air-quality in the vehicle. Hence, the control of the usage status of the vehicle is further validated and responsive to the validation being ineffective, the control of the usage status of the vehicle is further adjusted based on an updated control policy.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regards to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
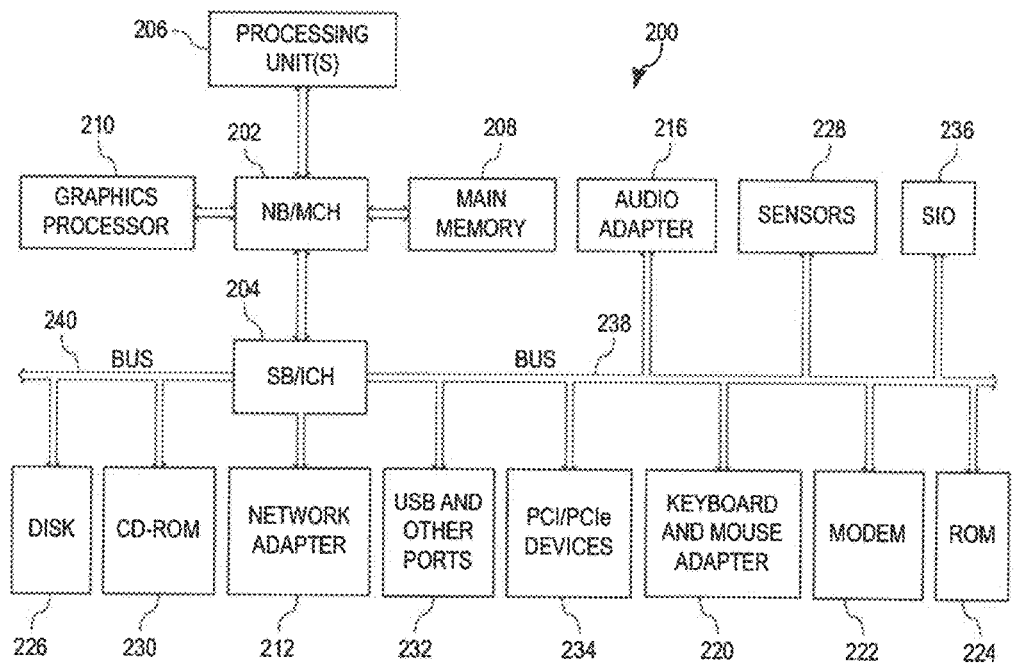
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, vehicles 110, 112, and 114 are also connected to network 102. These vehicles 110, 112, and 114 may be, for example, any type of vehicle that is equipped with sensors, such as air-quality sensors including but not limited to particle sensor, Total Volatile Organic Compound (TVOC) sensor, carbon dioxide ($CO_2$) sensor, thermonitor, hygrometer, or the like, for in-vehicle air-quality and atmosphere monitoring, cameras, ultrasound, infrared, a global positioning system (GPS), radar, or the like, and communication capabilities, such as Wi-Fi, Global System for Mobile Communications (GSM), Bluetooth, or the like, for precise localization, mapping, and data/information exchange. In the depicted example, vehicles 110, 112, and 114 are clients to server 104. Data, such as boot files, operating system images, and applications can be provided to the vehicles 110, 112, and 114 by the server 104 via the network 102. Or alternatively, the vehicles 110, 112, and 114 can be preconfigured with the aforementioned data. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., servers 104, 106 or vehicles 110, 112, and 114 may be specifically configured to implement the intelligent in-vehicle air-quality control mechanism. The configuring of the computing device may comprise the providing of application specific hardware, firmware, or the like to facilitate the performance of the operations and generation of the outputs described herein with regards to the illustrative embodiments. The configuring of the computing device may also, or alternatively, comprise the providing of software applications stored in one or more storage devices and loaded into memory of a computing device, such as servers 104, 106, or vehicles 110, 112, and 114 for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the illustrative embodiments and is not a general-purpose computing device. Moreover, as described hereafter, the implementation of the illustrative embodiments improves the functionality of the computing device and provides a useful and concrete result that facilitates intelligent in-vehicle air-quality control.

As noted above, the illustrative embodiments utilize specifically configured computing devices, or data processing systems, to perform the operations for intelligent in-vehicle air-quality control. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments of the mechanisms the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regards to the intelligent in-vehicle air-quality control.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, or to an embedded system with micro codes, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. In other illustrative examples, data processing system 200 may be the intelligent vehicle control system that works together with other systems of the vehicle to control the behavior of the vehicle. Essentially, data processing system 200 may be any known or later developed data processing system without architectural limitation.

FIG. 3 depicts an exemplary block diagram of an intelligent in-vehicle air-quality control mechanism in accordance with an illustrative embodiment. The intelligent in-vehicle air-quality control mechanism 300 comprises sensor data acquiring module 302, usage status determining module 304, changing trend determining module 306, control policy determining module 308, control signal sending module 310, control policy 314 and optionally control policy validating module 312. The sensor data acquiring module 302 acquires sensor data. These data acquired will be utilized by the usage status determining module 304 to determine the usage status of a vehicle. 'Usage status' here refers to the states of a vehicle that may contribute to the in-vehicle air-quality. These data include for example air-quality sensor data that can represent in-vehicle air-quality, which include at least one type of such data including but not limited to particle (e.g. PM2.5, PM10 or the like) concentration, $CO_2$ concentration, TVOC concentration, or the like. It should also be noted that other types of sensor data can also be acquired depending on whether sensors are installed in the vehicle and/or whether the data can contribute to the determination of the usage status of the vehicle. Other types of sensor data include for example environmental sensor data that can represent in-vehicle environment, including but not limited to temperature readings from a thermometer, humidity readings from a hygrometer, or the like. Besides all types of sensor data mentioned above, the sensor data acquiring module 302 can further acquire other types of data that are useful in determining and/or optimizing the determination of the usage status of the vehicle via a communication mechanism (not shown in FIG. 3). Such data can for example include weather forecast data (e.g. wind direction, wind speed, atmosphere temperature, atmosphere humidity, or the like), environment air-quality etc., received from a weather service.

Based on the acquired sensor data, the usage status determining module 304 determines usage status of the vehicle, such usage status for example include window status (open or close), ventilation status (fresh-air mode or recirculating-air mode), and in-vehicle air conditioner status (on or off, heating mode or cooling mode), or the like. In the following paragraphs, the determination of usage status of the vehicle will be discussed in detail.

In the following, usage status determination will be discussed with an example of window status determination. It should be noted that the following description is only for the purpose of illustration, those of ordinary skill in the art will be able to determine other usage status using similar logic based on the description and won't be discussed for the purpose of simplification.

As mentioned above, acquired sensor data include air-quality sensor data that can represent in-vehicle air-quality, including but not limited to particle (e.g. PM2.5, PM10 or the like) concentration, $CO_2$ concentration, TVOC concentration, or the like. Herein below, the determination of window status will be discussed with references to PM2.5 concentration and TVOC concentration as these two types of pollutants typically raise health concerns and are usually monitored. It should be noted that although in the following, the determination of window status is described by reference to PM2.5 concentration and TVOC concentration, those of ordinary skill in the art may utilize other types of sensor data, other types of data mentioned above, further types of data not mentioned above to determine window status of the vehicle without departing from the spirit and scope of the present invention. It should be also noted that although in the example that both PM2.5 concentration and TVOC concentration are utilized, PM2.5 concentration or TVOC concentration alone can be utilized to determine window status of the vehicle. Other types of data, alone or combined with PM2.5 concentration and/or TVOC concentration can also be utilized to determine window status of the vehicle.

Figure 4A:
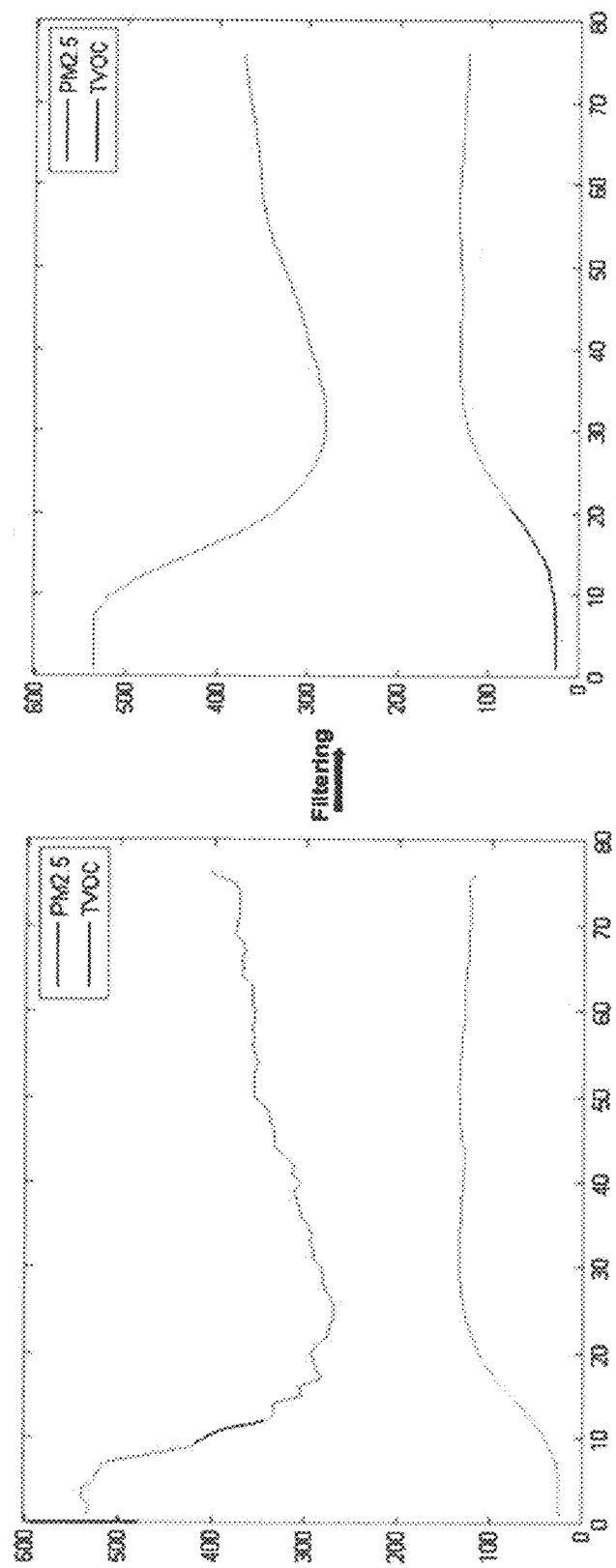
FIGS. 4A to 4C depict exemplary charts including in-vehicle PM2.5 concentration and TVOC concentration curves in accordance with acquired sensor data.

Now referring to FIG. 4A, in which acquired in-vehicle PM2.5 concentration and TVOC concentration are illustrated in the time-varying charts using two different curves. In the charts shown in FIG. 4A, the upper curve (PM2.5 concentration curve) represents in-vehicle PM2.5 concentration varying with time, constructed by connecting acquired respective values of PM2.5 concentration at each sampling time interval and the lower curve (TVOC concentration curve) represents in-vehicle TVOC concentration varying with time, constructed by connecting acquired respective values of TVOC concentration at each sampling time interval. In the left chart are the original curves, and in the right chart are the smoothened curves after applying low pass filters to remove noises caused by some operations such as acceleration. Low pass filters are applied because noises brought by some operations typically are high-frequency noises in accordance with related studies.

After removing noises, the smoothened curves are further segmented by identifying extreme points in the curves. Here, an extreme point is the boundary of two neighboring states, with each represents respectively a corresponding state of the vehicle (closed/open in window status scenario). An extreme point can also be referred as a 'turning point', which can be determined when the symbol of derivative (i.e. the slope of the tangent line to the curve at certain point) is changed e.g. from negative to positive, or vice versa. As shown in FIG. 4B, the PM2.5 concentration curve and TVOC concentration curve are segmented into four segments by three dash lines shown in the chart with each of them representing an extreme point. The principle of the segmentation is that the in-vehicle air-quality typically changes with window status change. For instance, the in-vehicle air-quality typically changes significantly after windows changing from closed to open due to the differences between in-vehicle air-quality and environmental atmosphere air-quality. Then, in accordance with an illustrative embodiment of the present invention, a cumulative sum (CUSUM) for each segment of the respective curve is further calculated to determine window status more accurately.

Figure 4C:
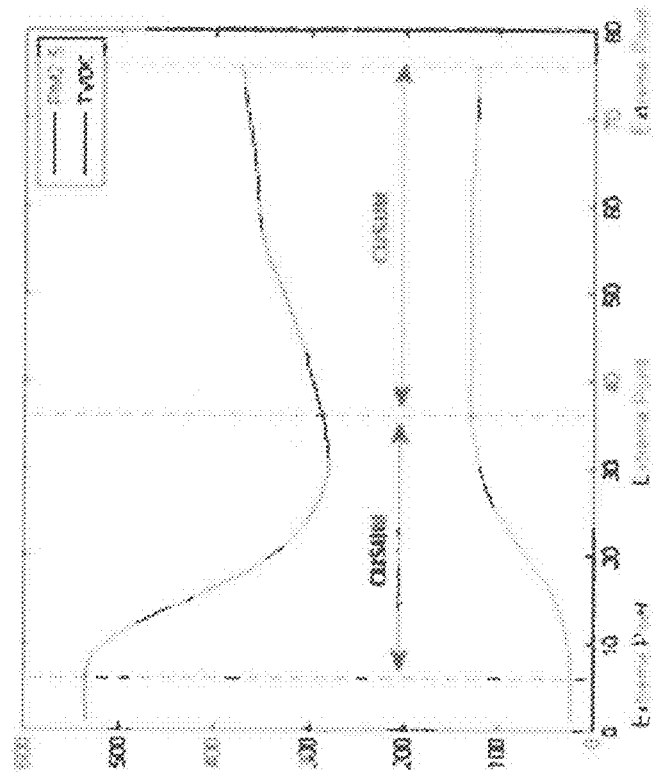
Figure 4B:
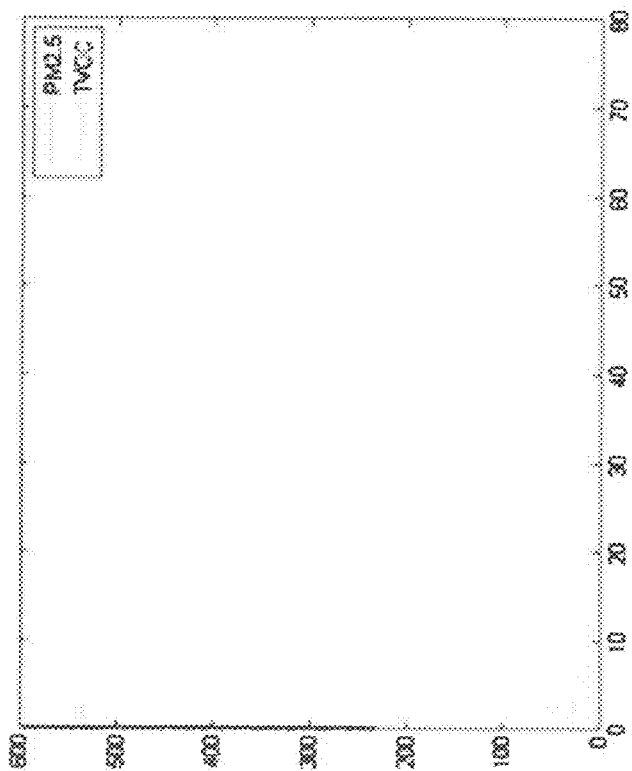

Now referring to FIG. 4C, suppose $x_i$ is the change rate of PM2.5 concentration or TVOC concentration, which could be determined by determining the slope of the tangent line to the respective curve at the specific sampling time interval i. Let:

$$S_n = \sum_{i=1}^{n} x_i$$

define: $f_h(s_n) = \begin{cases} 0, & s_n \geq h_n \\ 1, & s_n < h_n \end{cases}$ and $f_i(s_i) = \begin{cases} 0, & s_i \geq \dfrac{h_n}{n} * i \\ 1, & s_i < \dfrac{h_n}{n} * i \end{cases}$ where $h_n$ is a learned threshold for the summation of continuous n values.

With the above mentioned CUSUM, a cumulative sum is calculated to improve sensitivity and reduce false alarms. For example, for the segment between the first dash line and the second dash line, the CUSUMs indicates that the PM2.5 concentration is declining while the TVOC concentration is increasing. Then window status of the vehicle could be determined based on historical knowledge. For example, the decline of PM2.5 concentration might be caused by opening windows when environmental atmosphere PM2.5 concentration is lower than the in-vehicle PM2.5 concentration, or by closing windows when environmental atmosphere PM2.5 concentration is higher than the in-vehicle PM2.5 concentration. However, it shows in the chart that in-vehicle TVOC concentration is increasing for the time interval between the first dash line and the second dash line, which means windows are closed in accordance with historical knowledge. Therefore, it can be determined that the latter state is the correct window status of the vehicle for the time interval between the first dash line and the second dash line. Further, the usage status determining module 304 determines that windows are open for the time interval between the second dash line and the third dash line because the in-vehicle PM2.5 concentration increases while TVOC concentration keeps steady. The determined window status can be further represented by the following sequence (or any other possible data structure):

window state {close, open}

Window status determination based on PM2.5 concentration and TVOC concentration is described in the above as an example. Other than window status, other usage status can also be determined. For example, PM2.5 concentration and/or TVOC concentration can also be used to determine ventilation and/or air condition status of the vehicle. For example, if windows are closed, PM2.5 concentration increase typically indicates that the ventilation is utilizing fresh-air mode, as the pollutants are typically brought by pumping outside air into the vehicle. TVOC concentration increase typically indicates that air conditioner is in heat mode, as TVOC increases with the temperature. All the knowledge mentioned above can be found in related studies and will not be discussed in detail for simplification.

Referring again to the example shown in FIG. 4A, after usage status of the vehicle is determined, a changing trend of the in-vehicle air-quality is determined by the changing trend determining module 306 of the mechanism 300 based on the acquired sensor data and determined usage status. It is determined by the usage status determining module 304 that window status is open for the time interval between the second dash line and the third dash line and the in-vehicle air-quality at the right end (near the third dash line) of the curves indicates the most recent acquired sensor data. Based on the determined window status and acquired sensor data, a changing trend of the in-vehicle air-quality can be determined as getting worse because windows are open and PM2.5 concentration is increasing. Responsive to the determined changing trend being getting worse, the control policy determining module 308 will determine a control policy and then instruct the control signal sending module 310 to send control signals to a control system of the vehicle to control the usage status of the vehicle to change the usage status so that in-vehicle air-quality can be improved. For the example of FIG. 4A, the control signal could be the signal that instruct to close windows.

In the above-mentioned example, determination of usage status and control of which is described by reference to window status, it should be noted that for those of ordinary skill in the art, other type of usage status could be determined and controlled without departing from the spirit and scope of the present invention. Such usage status includes but is not limited to ventilation status (fresh-air mode or recirculating-air mode), and in-vehicle air conditioner status (on or off, heating mode or cooling mode), in-vehicle air purifier status (on or off, fan speed) or the like. Similarly, control policy is described by reference to window status (open or closed), however for those of ordinary skill in the art, other control policies could be utilized without departing from the spirit and scope of the present invention. Such control policies include but are not limited to turning on/off air conditioner, turning on/off heating/cooling mode of air conditioner, turning on/off fresh-air mode of ventilation, turning on/off recirculating-air mode of ventilation, turning on/off in vehicle air purifier, turn up/down in-vehicle air purifier, or the like.

Further, in accordance with another embodiment of the present invention, the control policy validating module 312 of the mechanism 300 may validate after a period of time whether the control of usage status of the vehicle is effective, i.e., improves the in-vehicle air-quality. If it is validated that the control of usage status of the vehicle is ineffective, adjust the control of the usage status based on an updated control policy, for example, send signal to the control system to turn on in-vehicle air-purifier to improve the air-quality, or the like.

Figure 5:
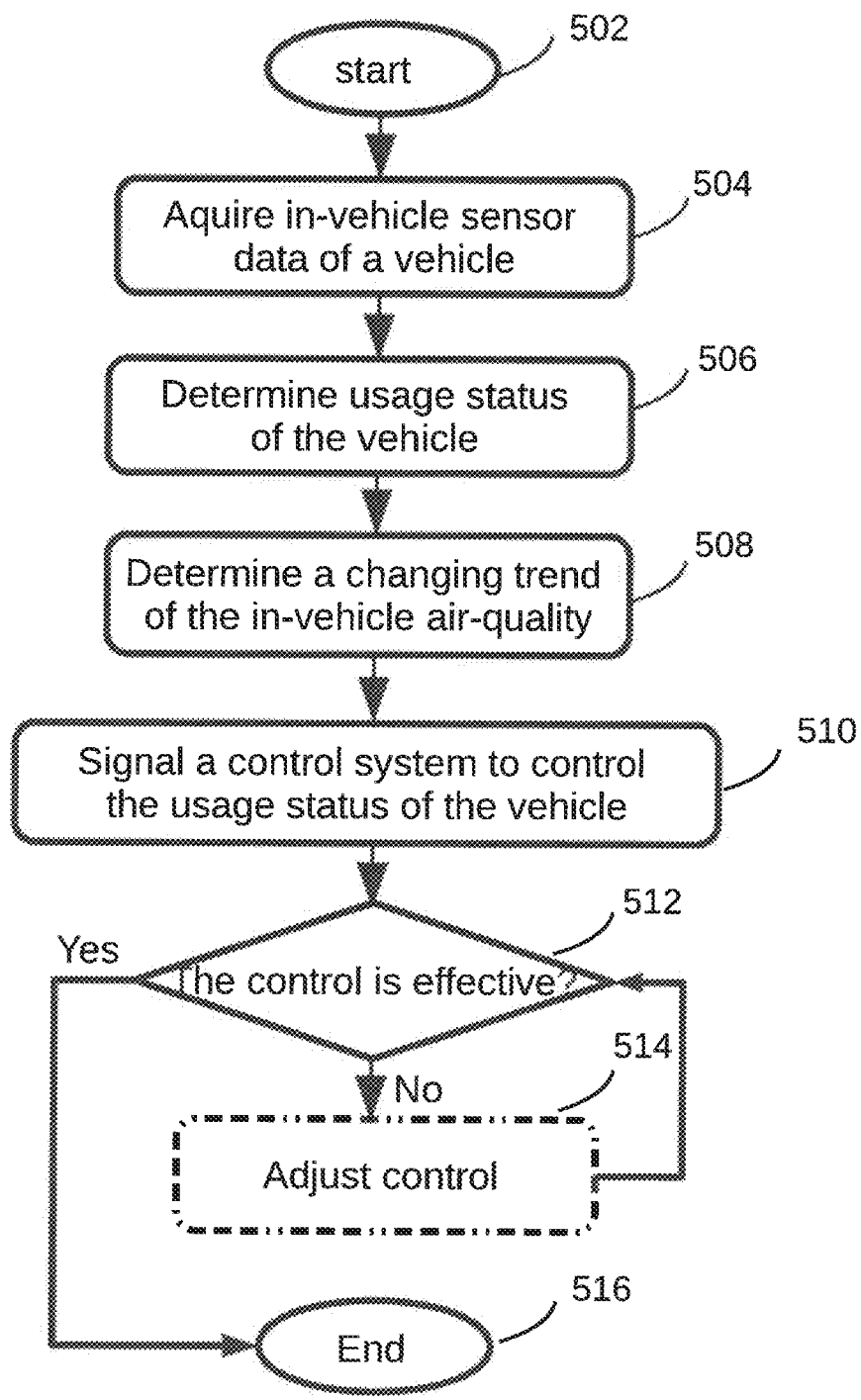
FIG. 5 exemplarily depicts an exemplary flowchart of the operation performed by an intelligent in-vehicle air-quality control mechanism in controlling the in-vehicle air-quality of a vehicle in accordance with an illustrative embodiment.

Now, referring to FIG. 5, which depicts an exemplary flowchart of a method 500 for intelligent in-vehicle air-quality control in accordance with an illustrative embodiment. The method 500 starts in the Step 502. Then, the method proceeds to Step 504.

In Step 504, in-vehicle sensor data of a vehicle is acquired. As aforementioned, a vehicle is typically equipped with multiple sensors including but not limited to air-quality sensors that are used to monitor the air-quality inside the vehicle, the in-vehicle air-quality sensor data include for example air-quality sensor data that can represent in-vehicle air-quality, include at least one type of such data including but not limited to particle (e.g. PM2.5, PM10 or the like) concentration, $CO_2$ concentration, TVOC concentration, or the like. It should also be noted that other types of sensor data can also be acquired depending on whether sensors are installed in the vehicle and/or whether the data can contribute to the determination of the usage status of the vehicle. Other types of sensor data include for example environmental sensor data that can represent in-vehicle environment, including but not limited to temperature readings from a thermometer, humidity readings from a hygrometer, or the like. Besides all types of sensor data mentioned above, the sensor data acquiring module 302 can further acquire other types of data that are useful in determining and/or optimizing the determination of the usage status of the vehicle via a communication mechanism (not shown in FIG. 3). Such data can for example include weather forecast data (e.g. wind direction, wind speed, atmosphere temperature, atmosphere humidity, or the like), environment air-quality etc., received from a weather service.

Then, in Step 506, the usage status of the vehicle is determined based on the acquired in-vehicle sensor data. 'Usage status' here refers to the states of a vehicle that may contribute to the in-vehicle air-quality. Such usage status includes but is not limited to window status (open or closed), ventilation status (fresh-air mode or recirculating-air mode), and in-vehicle air conditioner status (on or off, heating mode or cooling mode), in-vehicle air purifier status (on or off fan speed) or the like.

Further, in Step 508, a changing trend of the in-vehicle air-quality is determined based on the determined usage status of the vehicle and acquired sensor data. The determination of usage status of the vehicle and changing trend of in-vehicle air-quality has been described in the above and will not be discussed in detail here. Please refer the related parts in the description of the mechanism by reference of FIG. 3, 4A to 4C.

Then, in Step 510, a control system of the vehicle is further signaled to control the usage status of the vehicle responsive to the determination of the changing trend of the in-vehicle air-quality. Responsive to the determined changing trend of the in-vehicle air-quality being getting worse and/or reaching above a predetermined threshold, the control system of the vehicle is signaled to control at least one state of the vehicle based on the control policy selected from the group consisted of: closing window(s), turning off the heating mode of air conditioner, turning on the cooling mode of air conditioner, turning off the fresh-air mode of ventilation; turning on the recirculating-air mode of ventilation; turning on in-vehicle air purifier. Responsive to the determined changing trend of the in-vehicle air-quality being getting better and/or reaching lower than a predetermined threshold, the control system of the vehicle is signaled to control at least one state of the vehicle based on the control policy selected from the group consisted of: opening window(s), turning on the heating mode of air conditioner, turning off the cooling mode of air conditioner, turning on the fresh-air mode of ventilation; turning off the recirculating-air mode of ventilation; turning off in-vehicle air purifier.

Further, optionally in Step 512, whether the control of the usage status of the vehicle is effective, i.e., the in-vehicle air-quality is improved, is verified and, responsive to the validation of the control being ineffective, adjust the control of the usage status of the vehicle based on an updated control policy. The validation of the control of the usage status of the vehicle may be executed periodically to continuously monitor and intelligently control the in-vehicle air-quality.

Optionally, further data that may have impacts on the changing trend of the in-vehicle air-quality could be also acquired and based on which the changing trend of the in-vehicle air-quality could be further adjusted. These further data include but are not limited to environment pollutant concentration, road structure, traffic condition, the number of in-vehicle passenger, or the like.

It is described above the intelligent in-vehicle air-quality control mechanism 300, method 500 in accordance with illustrated embodiments of the present invention. It should be clear to those of ordinary skill in the art that, the present invention may be a system, a method, and/or a computer program product. The computer program product may include a computer readable storage medium (or media) having computer readable program instructions thereon for causing a processor to carry out aspects of the present invention.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
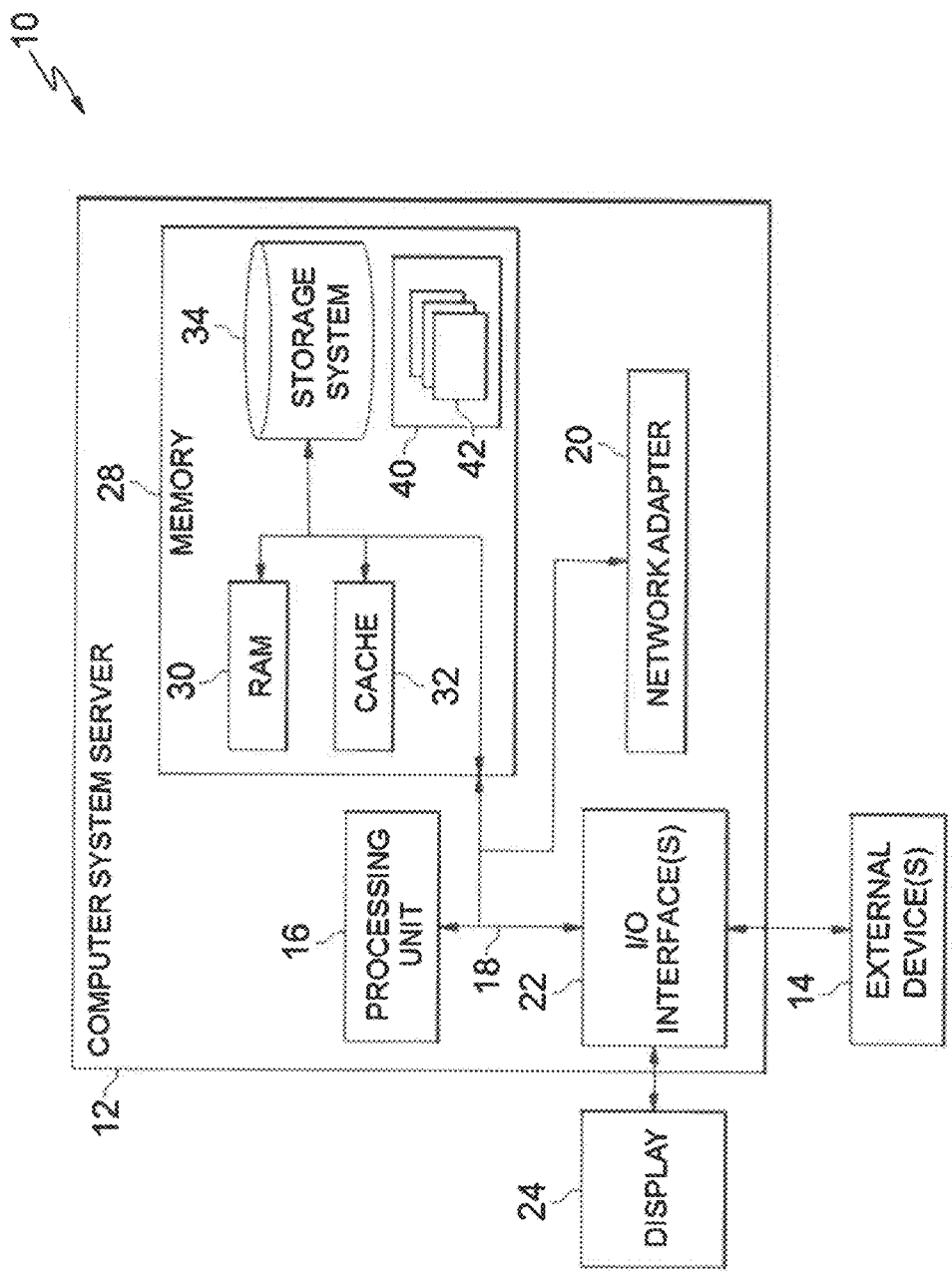
FIG. 6 exemplarily depicts a cloud computing node in accordance with some embodiments of the present invention.

Referring now to FIG. 6, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 6, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 7, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 7 are intended to be illustrative only and that computing nodes 10 and cloud computing environment 50 can communicate with any type of computerized circuit over any type of network and/or network addressable connection (e.g., using a web browser).

Figure 8:
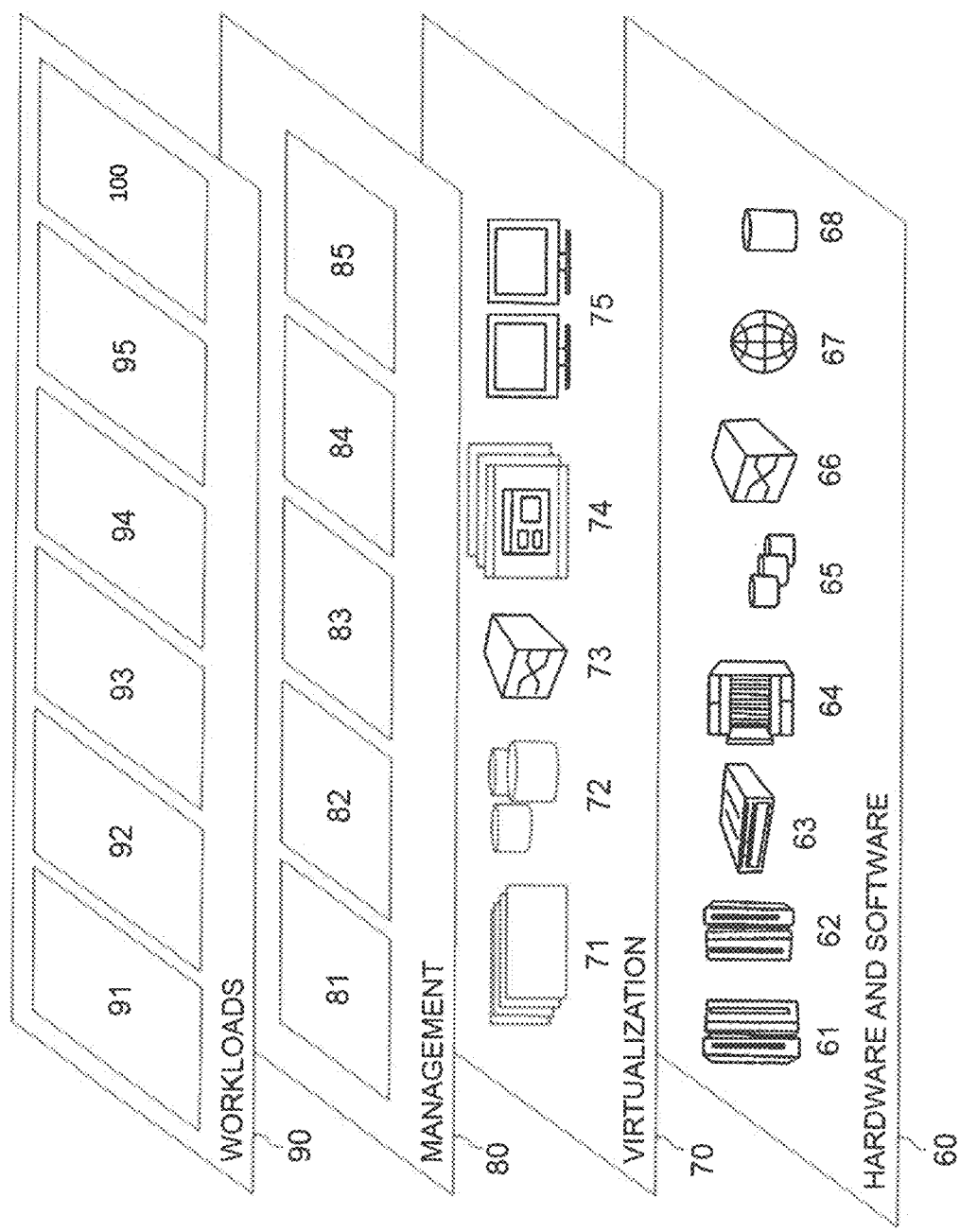
FIG. 8 exemplarily depicts abstraction model layers in accordance with some embodiments of the present invention.

Referring now to FIG. 8, an exemplary set of functional abstraction layers provided by cloud computing environment 50 (FIG. 8) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USB "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented method, in a data processing system comprising a processor and a memory coupled to the processor, for controlling an internal air-quality of a vehicle, the method comprising:
   acquiring, by the data processing system, a time series of in-vehicle sensor data of a vehicle;
   determining, by the data processing system, a usage status of the vehicle based on the acquired in-vehicle sensor data;
   determining, by the data processing system, a changing trend of the in-vehicle air-quality based on the acquired in-vehicle sensor data and the determined usage status, the changing trend being measured over a time of the time series of in-vehicle sensor data of the vehicle; and
   responsive to the determined changing trend of the in-vehicle air-quality, signaling, by the data processing system, a control system of the vehicle to control the usage status of the vehicle based on a control policy, wherein the control policy varies an inner circulation of air in the vehicle and an air exchange within the vehicle.

2. The computer-implemented method of claim 1, wherein a low pass filter is applied to the time series of in-vehicle sensor data to remove noises caused by the usage status of the vehicle, and
   wherein the in-vehicle sensor data comprises at least one type of the sensor data selected from the group consisting of particle concentration, $CO_2$ concentration, and total volatile organic compound (TVOC) concentration.

3. The computer-implemented method of claim 1, wherein the usage status of the vehicle comprises at least one state of the vehicle selected from the group consisting of a window status, an air conditioner status, and a ventilation status.

4. The computer-implemented method of claim 1, further comprising:
   responsive to the determined changing trend of the in-vehicle air-quality becoming at least one of worse and exceeding a predetermined threshold, signaling, by the data processing system, the control system of the vehicle to control at least one state of the vehicle based on the control policy selected from the group consisting of:
   closing window(s) of the vehicle;
   turning off a heating mode of an air conditioner;

turning on a cooling mode of the air conditioner;
turning off a fresh-air mode of ventilation;
turning on a recirculating-air mode of ventilation; and
turning on an in-vehicle air purifier.

5. The computer-implemented method of claim 1, further comprising:
responsive to the determined changing trend of the in-vehicle air-quality becoming at least one of better and not exceeding a predetermined threshold, signaling, by the data processing system, the control system of the vehicle to control at least one state of the vehicle based on the control policy selected from the group consisting of:
opening window(s) of the vehicle;
turning on a heating mode of an air conditioner;
turning off a cooling mode of the air conditioner;
turning on a fresh-air mode of ventilation;
turning off a recirculating-air mode of ventilation; and
turning off an in-vehicle air purifier.

6. The computer-implemented method of claim 1, further comprising:
acquiring, by the data processing system, further data that will have impact on the changing trend of the in-vehicle air-quality; and
adjusting, by the data processing system, the changing trend of the in-vehicle air-quality based on the further data.

7. The computer-implemented method of claim 6, wherein the further data comprises at least one type of data selected from the group consisting of environment pollutant concentration, road structure, a traffic condition, and a number of an in-vehicle passenger.

8. The computer-implemented method of claim 1, further comprising:
validating, by the data processing system, whether the control of the usage status of the vehicle is effective; and
adjusting, by the data processing system, the control of the usage status of the vehicle responsive to validation of the control being ineffective.

9. A computer program product comprising a non-transitory computer readable storage medium having a computer readable program stored therein, wherein the computer readable program, when executed on a computing device, causes the computing device to:
acquire a time series of in-vehicle sensor data of a vehicle;
determine a usage status of the vehicle based on the acquired in-vehicle sensor data;
determine a changing trend of the in-vehicle air-quality based on the acquired in-vehicle sensor data and the determined usage status, the changing trend being measured over a time of the time series of in-vehicle sensor data of the vehicle; and
responsive to the determined changing trend of the in-vehicle air-quality, signal a control system of the vehicle to control the usage status of the vehicle based on a control policy,
wherein the control policy varies an inner circulation of air in the vehicle and an air exchange within the vehicle.

10. The computer program product of claim 9, wherein the in-vehicle sensor data comprises at least one type of the sensor data selected from the group consisting of particle concentration, $CO_2$ concentration, and total volatile organic compound (TVOC) concentration.

11. The computer program product of claim 9, wherein the usage status of the vehicle comprises at least one state of the vehicle selected from the group consisting of a window status, an air conditioner status, and a ventilation status.

12. The computer program product of claim 9, wherein the computer readable program further causes the computing device to:
responsive to the determined changing trend of the in-vehicle air-quality becoming at least one of worse and exceeding a predetermined threshold, signal the control system of the vehicle to control at least one state of the vehicle based on the control policy selected from the group consisting of:
closing window(s) of the vehicle;
turning off a heating mode of an air conditioner;
turning on a cooling mode of the air conditioner;
turning off a fresh-air mode of ventilation;
turning on a recirculating-air mode of ventilation; and
turning on an in-vehicle air purifier.

13. The computer program product of claim 9, wherein the computer readable program further causes the computing device to:
responsive to the determined changing trend of the in-vehicle air-quality becoming at least one of better and not exceeding a predetermined threshold, signal the control system of the vehicle to control at least one state of the vehicle based on the control policy selected from the group consisting of:
opening window(s) of the vehicle;
turning on a heating mode of an air conditioner;
turning off a cooling mode of the air conditioner;
turning on a fresh-air mode of ventilation;
turning off a recirculating-air mode of ventilation; and
turning off an in-vehicle air purifier.

14. The computer program product of claim 9, wherein the computer readable program further causes the computing device to:
acquire further data that will have impact on the changing trend of the in-vehicle air-quality; and
adjust the changing trend of the in-vehicle air-quality based on the further data.

15. The computer program product of claim 9, wherein the further data comprises at least one type of data selected from the group consisting of environment pollutant concentration, road structure, a traffic condition, and a number of an in-vehicle passenger.

16. The computer program product of claim 9, wherein the computer readable program further causes the computing device to:
validate whether the control of the usage status of the vehicle is effective; and
adjust the control of the usage status of the vehicle responsive to validation of the control being ineffective.

17. An apparatus comprising:
a processor; and
a memory coupled to the processor, wherein the memory comprises instructions which, when executed by the processor, cause the processor to:
acquire a time series of in-vehicle sensor data of a vehicle;
determine a usage status of the vehicle based on the acquired in-vehicle sensor data;
determine a changing trend of the in-vehicle air-quality based on the acquired in-vehicle sensor data and the determined usage status, the changing trend being measured over a time of the time series of in-vehicle sensor data of the vehicle; and responsive to the determined changing trend of the in-vehicle air-quality, signal a control system of the vehicle to control the usage status of the vehicle based on a control policy,
wherein the control policy varies an inner circulation of air in the vehicle and an air exchange within the vehicle.

18. The apparatus of claim 17, wherein the instructions further cause the processor to:
responsive to the determined changing trend of the in-vehicle air-quality becoming at least one of worse and exceeding a predetermined threshold, signal the control system of the vehicle to control at least one state of the vehicle based on the control policy selected from the group consisting of:
closing window(s) of the vehicle;
turning off a heating mode of an air conditioner;
turning on a cooling mode of the air conditioner;
turning off a fresh-air mode of ventilation;
turning on a recirculating-air mode of ventilation; and
turning on an in-vehicle air purifier.

19. The apparatus of claim 17, wherein the instructions further cause the processor to:
responsive to the determined changing trend of the in-vehicle air-quality becoming at least one of better and not exceeding a predetermined threshold, signal the control system of the vehicle to control at least one state of the vehicle based on the control policy selected from the group consisting of:
opening window(s) of the vehicle;
turning on a heating mode of an air conditioner;
turning off a cooling mode of the air conditioner;
turning on a fresh-air mode of ventilation;
turning off a recirculating-air mode of ventilation; and
turning off an in-vehicle air purifier.

20. The apparatus of claim 17, wherein the instructions further cause the processor to:
validate whether the control of the usage status of the vehicle is effective; and
adjust the control of the usage status of the vehicle responsive to validation of the control being ineffective.

21. An apparatus comprising:
a processor; and
a memory coupled to the processor, wherein the memory comprises instructions which, when executed by the processor, cause the processor to:
determine a usage status of a vehicle based on a time series of in-vehicle sensor data;
determine a changing trend of the in-vehicle air-quality based on the in-vehicle sensor data and the determined usage status, the changing trend being measured over a time of the time series of in-vehicle sensor data; and
responsive to the determined changing trend of the in-vehicle air-quality, signal a control system of the vehicle to control the usage status of the vehicle based on a control policy,
wherein the control policy varies an inner circulation of air in the vehicle and an air exchange within the vehicle.

22. The apparatus of claim 21, wherein the instructions further cause the processor to:
responsive to the determined changing trend of the in-vehicle air-quality becoming at least one of worse and exceeding above a predetermined threshold, signal the control system of the vehicle to control at least one state of the vehicle based on the control policy selected from the group consisting of:
closing window(s) of the vehicle;
turning off a heating mode of an air conditioner;
turning on a cooling mode of the air conditioner;
turning off a fresh-air mode of ventilation;
turning on a recirculating-air mode of ventilation; and
turning on an in-vehicle air purifier.

23. The apparatus of claim 21, wherein the instructions further cause the processor to:
responsive to the determined changing trend of the in-vehicle air-quality becoming at least one of better and not exceeding a predetermined threshold, signal the control system of the vehicle to control at least one state of the vehicle based on the control policy selected from the group consisting of:
opening window(s) of the vehicle;
turning on a heating mode of an air conditioner;
turning off a cooling mode of the air conditioner;
turning on a fresh-air mode of ventilation;
turning off a recirculating-air mode of ventilation; and
turning off an in-vehicle air purifier.

24. The apparatus of claim 21, wherein the instructions further cause the processor to:
validate whether the control of the usage status of the vehicle is effective; and
adjust the control of the usage status of the vehicle responsive to validation of the control being ineffective.

25. A computer-implemented method, in a data processing system comprising a processor and a memory coupled to the processor, for controlling an internal air-quality of a vehicle, the method comprising:
determining, by the data processing system, a usage status of a vehicle based on a time series of in-vehicle sensor data;
determining, by the data processing system, a changing trend of the in-vehicle air-quality based on the in-vehicle sensor data and the determined usage status, the changing trend being measured over a time of the time series of in-vehicle sensor data; and
responsive to the determined changing trend of the in-vehicle air-quality, signaling, by the data processing system, a control system of the vehicle to control the usage status of the vehicle based on a control policy,
wherein the control policy varies an inner circulation of air in the vehicle and an air exchange within the vehicle.

* * * * *